US009985855B2

(12) United States Patent
Dickins et al.

(10) Patent No.: US 9,985,855 B2
(45) Date of Patent: May 29, 2018

(54) CALL QUALITY ESTIMATION BY LOST PACKET CLASSIFICATION

(71) Applicant: DOLBY LABORATORIES LICENSING CORPORATION, San Francisco, CA (US)

(72) Inventors: Glenn N. Dickins, Como (AU); Hannes Muesch, Oakland, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 124 days.

(21) Appl. No.: 14/410,753

(22) PCT Filed: Jun. 26, 2013

(86) PCT No.: PCT/US2013/047960
§ 371 (c)(1),
(2) Date: Dec. 23, 2014

(87) PCT Pub. No.: WO2014/004708
PCT Pub. Date: Jan. 3, 2014

(65) Prior Publication Data
US 2015/0207710 A1 Jul. 23, 2015

Related U.S. Application Data

(60) Provisional application No. 61/665,315, filed on Jun. 28, 2012.

(51) Int. Cl.
*H04L 1/00* (2006.01)
*H04L 12/26* (2006.01)
(Continued)

(52) U.S. Cl.
CPC .......... *H04L 43/0829* (2013.01); *H04L 45/74* (2013.01); *H04L 47/2441* (2013.01);
(Continued)

(58) Field of Classification Search
CPC ................................................... H04L 43/0829
See application file for complete search history.

(56) References Cited

U.S. PATENT DOCUMENTS 6,781,955 B2   8/2004   Leung
6,885,638 B2   4/2005   Xu
(Continued)

FOREIGN PATENT DOCUMENTS

WO   2008/068167   6/2008

OTHER PUBLICATIONS

Chin, K.V. et al. "Enhancing the Quality of Internet Voice Communication for Internet Telephony Systems" Jul. 1998, Journal of Network and Computer Applications, vol. 21, pp. 203-218.
(Continued)

*Primary Examiner* — Huy D Vu
*Assistant Examiner* — Kevin Cunningham

(57) ABSTRACT

Described are: a method, an apparatus, and a tangible computer-readable storage medium comprising instructions to instruct one or more processors to carry out a method. One set of methods is for the transmit side of a communication link and another set of methods is for the receive side. A transmit side method includes assigning one of a set of classifications to media, e.g., voice/audio packets transmitted in a sequence, different classifications impacting differently a measure of perceptual quality calculated at the receive side if packets of the respective classifications are lost. A present packet is sent to the receive side containing the classification of a previous packet.

32 Claims, 5 Drawing Sheets

(51) Int. Cl.
  *H04L 29/06* (2006.01)
  *H04L 12/741* (2013.01)
  *H04L 12/851* (2013.01)
  *H04L 12/835* (2013.01)
  *H04L 12/801* (2013.01)

(52) U.S. Cl.
  CPC .............. *H04L 47/30* (2013.01); *H04L 47/34* (2013.01); *H04L 65/80* (2013.01)

(56) References Cited

U.S. PATENT DOCUMENTS

| | | |
|---|---|---|
| 7,058,568 B1 | 6/2006 | Lewis |
| 7,099,282 B1 | 8/2006 | Hardy |
| 7,103,371 B1 | 9/2006 | Liu |
| 7,346,029 B2 | 3/2008 | Lee |
| 7,489,678 B2 | 2/2009 | Aoyagi |
| 7,769,045 B2 | 8/2010 | Taylor |
| 2002/0075857 A1 | 6/2002 | Leblanc |
| 2005/0232179 A1 | 10/2005 | Dacosta |
| 2006/0271359 A1 | 11/2006 | Khalil |
| 2007/0242662 A1* | 10/2007 | Connor .............. H04L 12/2602 370/352 |
| 2008/0192629 A1 | 8/2008 | Chari |
| 2008/0212567 A1* | 9/2008 | El-Hennawey ......... G10L 25/69 370/352 |
| 2009/0080463 A1* | 3/2009 | Yang ..................... H04L 47/193 370/476 |
| 2009/0180531 A1* | 7/2009 | Wein ....................... G10L 19/08 375/240 |
| 2009/0257361 A1 | 10/2009 | Deshpande |
| 2011/0077940 A1* | 3/2011 | Vos ....................... G10L 19/005 704/229 |
| 2011/0125505 A1* | 5/2011 | Vaillancourt ......... G10L 19/005 704/500 |
| 2011/0211450 A1 | 9/2011 | Meloche |
| 2012/0013748 A1 | 1/2012 | Stanwood |

OTHER PUBLICATIONS

Liao, Wen-Tsai, et al. "Adaptive Recovery Techniques for Real-Time Audio Streams" IEEE Proc. on Computer Communications, vol. 2, Apr. 22, 2001, pp. 815-823.

ITU-T G.107, "The E-Model, A Computational Model for Use in Transmission Planning" Mar. 2003.

ITU-T P.564, "Conformance Testing for Voice Over IP Transmission Quality Assessment Models" Nov. 2007.

\* cited by examiner

CALL QUALITY ESTIMATION BY LOST PACKET CLASSIFICATION

CROSS-REFERENCE TO RELATED APPLICATIONS

This application claims priority to U.S. Provisional Patent Application No. 61/665,315 filed on 28 Jun. 2012, the contents of which are incorporated herein by reference.

TECHNICAL FIELD OF THE INVENTION

The present disclosure relates generally to the processing of audio signals.

BACKGROUND OF THE INVENTION

In commercial communication systems, it is desirable to track call quality, e.g., as one or more measures of quality of service of communication links, because call quality is significant to user experience and to system stability. Monitoring call quality is used for provisioning networks and for properly allocating network resources. This is applicable to voice communication, e.g., voice communication over IP (VoIP), and to communicating other streams of media packets, e.g., streams of packets containing video and/or audio data.

One of the key reasons for degradation of quality is lost packets. When a real time stream of media packets is sent, e.g., a VoIP stream, at the receive side, there is a limit as to how long to buffer the arriving packets, e.g., in order to limit the delay. If a packet does not arrive within a pre-defined window of time, it is considered a lost packet. Modern networks may thus log and analyze statistics and/or other information that relate to packet loss. When packet loss is detected, packet loss concealment (PLC) may be used, and many methods for PCL are known. For example, many voice codecs include PLC, including, e.g., ITU-T G.722 codecs and others.

It is desired to obtain a measure of perceptual voice quality online at the receiving end of a communication link. One method of measuring call quality, e.g., as a measure of perceptual voice quality is to measure the statistics of lost packets, and/or other information on the lost packets, and to use such statistics and/or other information of lost packets to obtain a measure of perceptual voice quality for the link. Many methods are known for so determining a measure of perceptual voice quality online at the receiving end of a communication link. Because of PLC, and because of where in time a packet appears, some lost packets do not impact voice quality as much as others.

The approaches described in this BACKGROUND section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

DESCRIPTION OF EXAMPLE EMBODIMENTS

Figure 1:
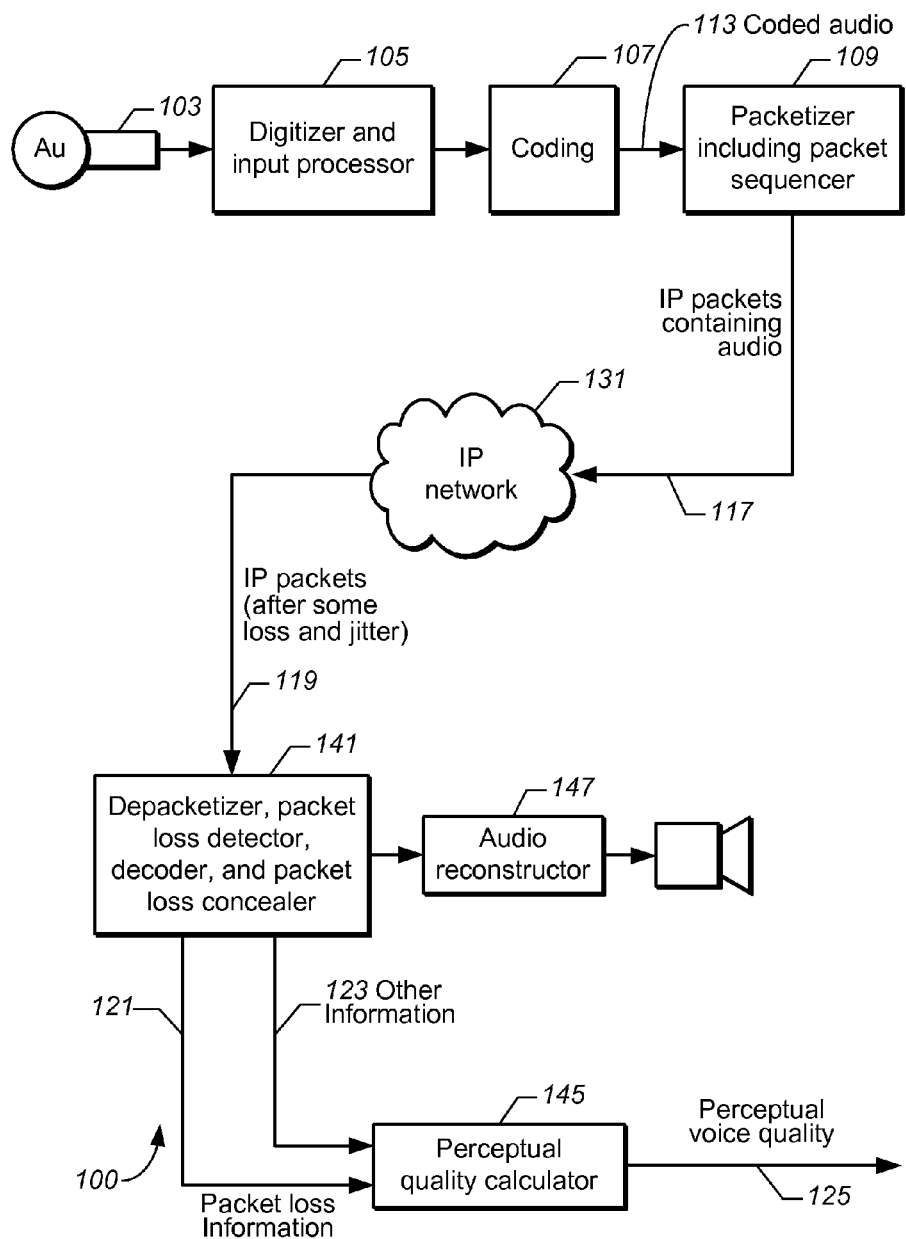
FIG. 1 shows a simplified block diagram of a prior art communication system that includes a transmit side, a link that includes a packet network, and a receive side.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be used without departing from the principles described herein.

Overview

Embodiments of the present invention include a method, an apparatus, and a tangible computer-readable storage medium comprising instructions to instruct one or more processors to carry out a method. A communication system comprises a transmit side, the link itself, e.g., comprising a packet network, and a receive side. One set of methods is for the transmit side of a communication link and another method is for the receive side.

One feature of some embodiments of the invention is assigning, at a transmit side of a communication link, one of a set classifications to media, e.g., voice/audio packets transmitted in a sequence. Each packet includes content and the content portion of any packet differs in the nature of its signal characteristics or corresponding acoustically rendered perceptive effects from the content portion of other packets. Thus, the impact of loss of a specific packet or a specific contiguous plurality of packets on the perceptual media quality of a call over a communication link may be different from the impact of dropping one or more other packets. Another aspect of embodiments of the invention is calculating a measure of the perceptual quality of a call or communication link using the classification of packets that are lost. Lost packets include those packets that do not arrive at the receive side of the communication link within a pre-defined time. If the classification of a packet was sent with or attached to a present packet, this classification would not be usable should the packet be lost. Another aspect of embodiments of the invention is attaching or otherwise sending with a present packet the classification of one or more previous packets. Yet another aspect of the embodiments of the invention is the mechanism for how the delay(s) between a present packet and the previous one or more packets whose classification(s) is or are sent with the present packet is or are determined.

Particular embodiments include a method of sending a stream of packets containing media data via a packet network. The method comprises incorporating in a particular packet of the stream a classification of a previous packet that is a time period earlier in the stream. The classification is indicative of an impact that loss of the previous packet has on a measure of perceptual quality dependent on statistics and/or other information of lost packets and of their respective classifications. The particular packet can be sent to a receiver via the packet network and the receiver can use statistics and/or other information of lost packets and of their respective classifications to calculate the measure of quality.

In some versions, the method further comprises forming the particular packet, including accepting an amount of digitized media data and determining a classification of a set of classifications for the amount of digitized media data. Different classifications are indicative of different impacts that loss of the amount of digitized media data or of neighboring digitized media data would have on the perceptual media quality of the stream of media data. In these versions, the method further comprises storing the determined classification in a buffer, retrieving the classification of the previous packet from the buffer, and packetizing the amount of digitized media data with the retrieved classification into, at least, the particular packet.

In other versions, each packet in the stream includes an amount of digitized media data and the method further comprises: prior to the incorporating of the classification in the particular packet, extracting from the particular packet the amount of digitized media; determining a classification of a set of classifications for the amount of digitized media data, wherein different classifications are indicative of different impacts that loss of the amount of digitized media data or of neighboring digitized media data would have on the perceptual media quality of the stream of media data; storing the determined classification in a buffer; and retrieving the classification of the previous packet from the buffer for incorporation into the particular packet.

Particular embodiments include a method of transmitting packets of an ordered stream of media data. The method comprises accepting an amount of digitized media data and determining a classification of a set of classifications for the amount of digitized media data, with different classifications being indicative of different impacts that loss of the amount of digitized media data or of neighboring digitized media data would have on the perceptual media quality of the stream of media data. The method further comprises storing the determined classification such that it may be retrieved for inclusion with data of future packets of the stream and packetizing the amount of digitized media data into at least one packet of the ordered stream of packets, including embedding or otherwise including with each packet containing any of the amount of digitized media a previous classification that was stored for a previous packet that is a time period earlier in the ordered stream of packets wherein the at least one packet of the ordered stream of packets is sendable to a receiver via a packet network. The receiver of packets of the ordered stream sent to the receiver via the packet network is able to use the classifications in the received packets of the stream to accumulate statistics and/or other information on packet loss and on classifications of packets that are lost and to use the statistics and/or other information on packet loss and classifications of packets that are lost to determine a measure of perceptual media quality.

Particular embodiments include a signal processing system comprising at least one processor and storage, the storage comprising instructions that when executed by one or more of the at least one processor cause carrying out any one of the transmit side methods recited above in this Overview section.

Particular embodiments include a method of determining a measure of perceptual media quality for communicating an ordered stream of packets of media data over a communication link comprising a packet network. The ordered stream is sent from a transmit side of the communication link to a receive side of the communication link, the method being operative at the receive side of the communication link. The method comprises receiving at the receive side of the communication link packets of media data from the ordered stream of media data. A received packet comprises media data and classification information about the media data in a previous packet from the ordered stream that was sent from the transmit side a time period earlier than the received packet. The classification information comprises one of a set of classifications of digital audio data in a packet, with different classifications of the set being indicative of different impacts that loss of the packet containing the digital audio data, or loss of one or more neighboring packets, would have on the perceptual media quality. The method further comprises buffering the received packets, so that out-of-order packets can be re-ordered; determining the classification information for previous packets from the classification information in packets that are received; detecting packet loss, accumulating statistics and/or other information on packet loss, and classifying packets that are lost; and calculating a measure of perceptual media quality using the statistics and/or other information on packet loss and classifications of packets that are lost.

Particular embodiments include a signal processing system comprising at least one processor and storage, the storage comprising instructions that when executed by one or more of the at least one processor, cause carrying out the method of determining a measure of perceptual media quality recited above in this Overview section.

In any of the methods described above in this Overview section, the media data can comprise audio data representing voice data.

Particular embodiments include a non-transitory computer-readable medium comprising instructions that when executed by one or more processors of a processing system cause carrying out the steps of a method as described above in this Overview section.

Particular embodiments include an apparatus, coupled to a packet network, for sending a stream of packets containing media data at a transmit side of the packet network. The apparatus comprises a classifier operative to accept an amount of digitized media data of or for a particular packet and to determine a classification of a set of classifications for the amount of digitized media data, different classifications being indicative of different impacts that loss of the amount of digitized media data or of neighboring digitized media data would have on the perceptual media quality of the stream of media data. The apparatus further comprises a buffer coupled to or in the classifier and operative to store classifications of packets, including the determined classification of the amount of digitized media data. The apparatus further comprises a packetizer operative to incorporate in the particular packet of the stream a classification of a previous packet that is a time period earlier in the stream, the classification indicative of an impact that loss of the previous packet has on a measure of perceptual quality dependent on statistics and/or other information of lost packets and of their respective classifications, such that the particular packet with an amount of digitized media data and the incorporated classification can be sent to a receiver via the packet network. The receiver uses statistics and/or other information of lost packets and of their respective classifications to calculate the measure of quality.

In one version, the apparatus further comprises an input processor operative to accept media data and to form the amount of digitized media data and a coder to encode the digitized media data into a coded form for incorporation in the particular packet.

Particular embodiments include an apparatus at the receive side of a communication link comprising a packet network, the apparatus being for determining a measure of perceptual media quality for communicating an ordered stream of packets of media data over the communication link. The ordered stream is sent from a transmit side of the communication link to the receive side of the communication link. The apparatus comprises a receiver coupled to the packet network and operative to receive packets of media data from the ordered stream of media data. A received packet comprises media data and classification information about the media data in a previous packet from the ordered stream that was sent from the transmit side a time period earlier than the received packet. The classification information comprises one of a set of classifications of digital audio data in a packet, different classifications of the set being indicative of different impacts that loss of the packet containing the digital audio data or that loss of one or more neighboring packets would have on the perceptual media quality. The apparatus further comprises a buffer operative to store the received packets, so that out-of-order packets can be re-ordered. The apparatus further comprises a classification extractor coupled to the buffer and operative to determine the classification information for previous packets from the classification information in packets that are received, a packet loss detector to detect packet loss, a packet loss statistics and/or other information accumulator coupled to the packet loss detector and operative to accumulate statistics and/or other information on packet loss and classifications of packets that are lost, and a calculator of a measure of perceptual media quality that uses the statistics and/or other information on packet loss and classifications of packets that are lost.

In some embodiments of the apparati and methods, the time period is a pre-defined constant that is the same for all received packets that include classification information of a packet that is the time period earlier in the stream. In other embodiments of the apparati and methods, the time period varies for different packets in the stream that incorporate classification information of a previous packet that is the time period earlier in the stream.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Receive Side and Transmit Side Embodiments

The present invention is applicable to measuring the perceptual quality of a call at the receive side of a communication link. This is also called passive monitoring to distinguish it from active monitoring according to which test data are inserted into the communication link and used to obtain performance measurements. Passive monitoring includes examining operating characteristics of the communication link, including such characteristics as statistics of lost packets, other information on the lost packers, buffer levels of buffers being used, the type of codec used, the type of packet loss concealment (PLC) used, jitter, and so forth. In the case of voice, at the transmit side of a communication link, the audio data, e.g., audio data that might include voice, undergo input processing, including pre-processing, coding, packetizing, and transmitting. The packetized data in the form of IP packets with the data encoded, e.g., using RTP, are transmitted over a communication link, e.g., an IP network. At the receive side, the data are detected, de-packetized, decoded, and reconstructed to form audio. It is desired to determine a measure of the quality of communication as would be perceived by a listener in the case of audio or a viewer in the case of video.

While the present invention will be presented in the context of voice data, e.g., voice over IP (VoIP), the invention is equally applicable to the transmission of any media data, such as audio, video, and audiovisual information. How to modify the details presented herein to be applicable to audio, video, or audiovisual information would be straightforward to one skilled in the art.

Note also that the terms "packets" and "temporal frames" are sometimes used interchangeably. A temporal frame is a number of samples of digital media data, representing, e.g., 20 ms (5 ms to 60 ms is a typical range) and is the smallest amount of data used, for example, for input processing using a transform, e.g., an overlapped transform. A packet is the smallest unit of data transported by a packet network. When the packet contains media data, it represents a number of time samples. Typically, when RTP is used, a packet corresponds to 20 ms. Those skilled in the art will recognize that in some cases, a packet may include multiple frames, e.g., when a RTP 20 ms packet is used to send 5 ms ACELP-encoded frames. Those skilled in the art will understand that often where the terms "packets" or "frames" are used herein, they can be used interchangeably.

FIG. 1 shows a simplified block diagram of a prior art communication system 100 that includes a transmit side comprising a microphone or other source of an audio signal 103, a digitizer and input processor 105 operative to convert the audio signal to digital audio data in a form for coding, including pre-processing, which can include determining metadata to embed with the digital audio data, a coder 107 operative to encode the digital audio data and at least some of the metadata into coded digital audio data 113, e.g., as temporal frames or as sets of samples of coded digital audio data, and a packetizer operative to packetize the temporal frames or sets of coded digital audio data 113 and any remaining metadata not included in the coded digital audio data into packets, e.g., RTP packets over UDP IP packets for transmission over a communication link to which the transmit side is coupled. The packetizer includes a packet sequencer providing information sufficient for a receiver of the packets receiving the packets out of order to be able to re-order the packets into the correct order. As one example, the sequencer adds packet sequence numbers. RTP packets, for example, include a 16-bit sequence number, as well as a timestamp.

The communication link includes a packet network, e.g., an IP network 131. A receive side to which packets from the transmit side are addressed is coupled to the network 131.

The receive side comprises a depacketizer, packet loss detector, decoder and packet loss concealer element 141 operative to receive the IP packets sent by the transmit side, possibly out of order with some packet loss and/or with some jitter, and to carry out depacketizing, packet loss detecting, decoding, and packet loss concealment (PLC) in order to determine from the received packets decoded temporal frames of digital audio data and also to determine packet loss information 121, e.g., a measure of the average packet loss rate determined over a pre-determined time period and usable to calculate a measure of perceptual audio quality, and in some versions, other information usable to calculate the measure of perceptual audio quality. The receive side also includes an audio reconstructor 147 operative to generate an audio signal for reproduction, e.g., by a loudspeaker from the decoded temporal frames of digital audio data. The receive side also includes a perceptual quality calculator 145 operative to calculate a measure of perceptual voice quality 125 for the communication system 100.

The perceptual quality calculator 145 determines the measure of perceptual voice quality 125 from information 121 about the packet losses and possibly other information 123. In one embodiment, the packet loss information 121 determined in element 141 includes a measure of the average packet loss rate as measured over a pre-defined (and settable) time interval. In one example embodiment, the voice quality measure 125 is a Mean Opinion Score, denoted MOS, that is a function, denoted f(•), of the average packet loss rate, denoted APLR, in units of percent so that MOS=f (APLR). In a simple example embodiment, f(•) is a linear function, e.g., $$MOS=\beta-\alpha\ APLR,$$

where α is a positive constant, a typical value being 0.125 for APLR being in percent, and β denotes a MOS value when no packets are lost, e.g., 4.55 if there are no other degradations. In another embodiment, 13 is a function of other degradations, e.g., the other information 123.

Alternate embodiments use more sophisticated models to determine the MOS, using, for example, second order packet-loss statistics, and also using other parameters, such as jitter, codec type, packet loss concealment (PLC) method, and so forth, as other information 123, and as would be known to those in the art. A variation of the E-model can be used to determine an estimate of how the voice quality might be affected. Using a modified E-model: based on the number and the bursting of the packet loss, an estimate of the perceptual voice quality loss can be calculated. The ITU-T G.107 defines the E-model, a computational model combining all impairment parameters that affect a voice call into a single factor, which can be converted into MOS scale. See ITU-T Rec. G.107. The E-Model, A Computational Model For Use in Transmission Planning. 2003. There is also Real Time Control Protocol—Extended Report (RTCP-XR), defined in RFC 3611, a proposed scheme to exchange voice quality information given by the E-Model calculation in order to enable feedback responses. Also, ITU T Recommendation P.564 titled "Conformance testing for voice over IP transmission quality assessment models, describes IP transmission quality assessment models that can be altered to include packet loss and classification statistics according to embodiments of the present invention.

The processes carried out by the elements of FIG. 1 would be known to those skilled in the art, and many variations of such processes also would be known to those skilled in the art. For this reason, such known processes are not described in detail herein, except as necessary for including aspects of the present invention.

One aspect of embodiments of the present invention is that the determining of the measure of perceptual voice quality 125 is improved by using information about the respective media signal that was encoded in packets that are lost. Lost packets include those packets that do not arrive at the receive side of the communication link within a predefined time. For this, a modified perceptual quality calculator is used. Another aspect of embodiments of the invention is a mechanism provided to the transmit side to incorporate into packets that are transmitted such information about the media signal that is encoded in each packet that may be lost, so that a receiver can determine information about the respective media signal that was encoded in packets that are lost. This is done at the transmit side by classifying packets according to where they are in the stream of audio packets. Different types of packets (or one or more neighboring packets) have different impacts when lost. At the transmit side, receiving this information about packets that are lost provides additional information for the method of estimating voice quality. The additional information takes into account where the loss of packets occurs, and the impact this loss is likely to have on voice quality.

As an example, one aspect of the present invention can extend a prior art method of calculating voice quality by providing additional information to a voice quality calculator. Another aspect uses a perceptual quality calculator that is not simply a modification of a known perceptual quality calculator.

Figure 2:
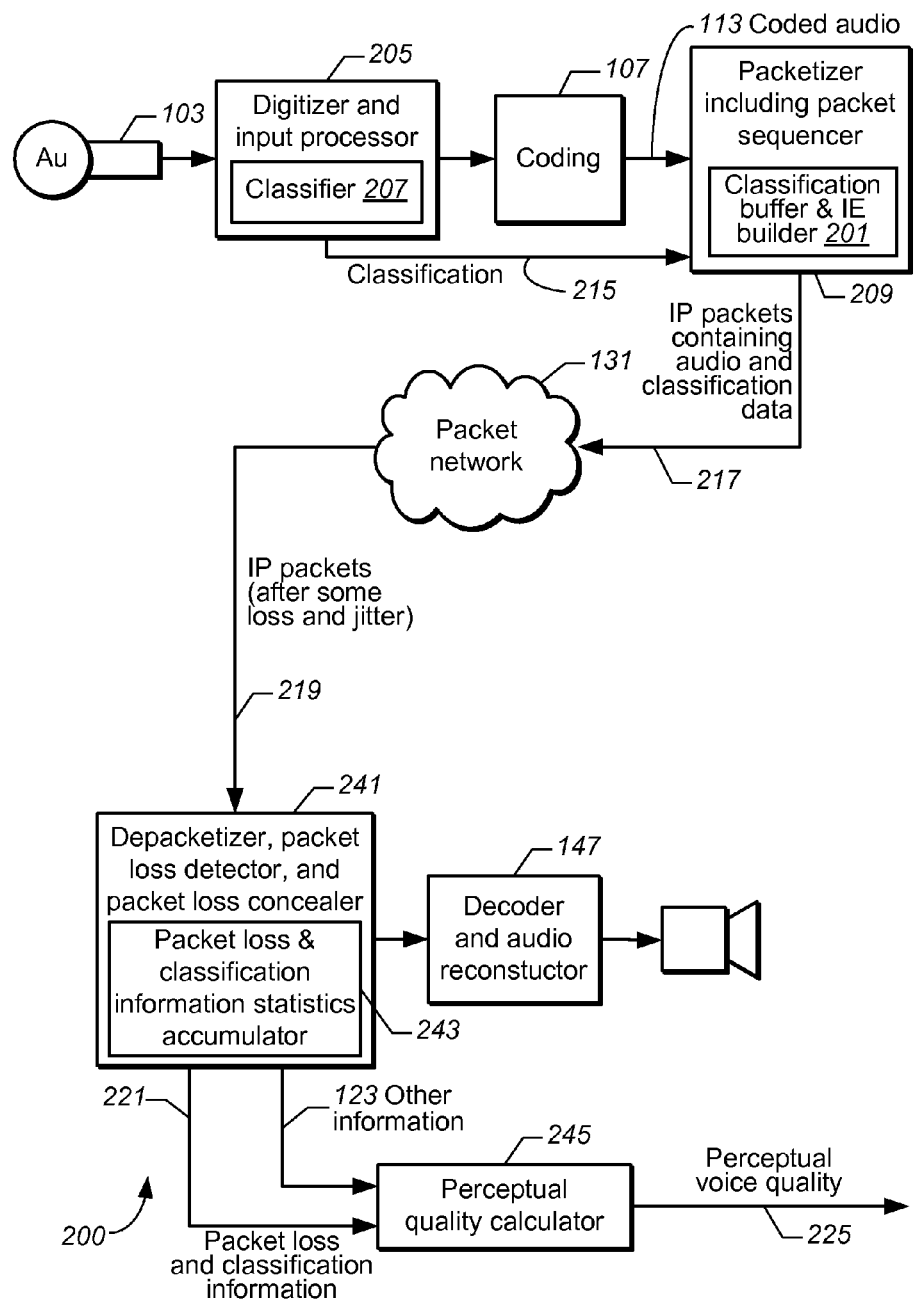
FIG. 2 shows a block diagram of an embodiment of a communication system that includes a transmit side embodiment and a receive side embodiment of the present invention.

FIG. 2 shows a block diagram of an embodiment of a communication system 200 that includes a transmit side embodiment and a receive side embodiment of the present invention. Some of the processes in system 200 are the same as those in FIG. 1, while others include some similar features, and additionally, one or more features of the present invention as described herein.

System 200 includes a transmit side comprising a microphone or other source of an audio signal 103, and a digitizer and input processor 205 operative to convert the audio signal to digital audio data in a form for coding and to pre-process the digital audio data, including determining any metadata to embed with the digital audio data. One feature of the transmit side in embodiments of the invention is the inclusion of a classifier 207, which in system 200 is part of the digitizer and input processor 205. Classifier 207 is operative to classify the digital audio data, e.g., on a temporal frame-by-frame basis in the case that the input processing operates frame-by-frame, otherwise on a packet-by-packet basis, into one or a set of classifications, different classifications of the set indicative of different impacts a lost packet containing all or some of the temporal frame of audio data (or one or more neighboring packets) would have on the perceptual voice quality. Thus classifier 207 of digitizer and input processor 205 produces a classification 215. System 200 further comprises a coder 107 operative to encode the digital audio data and at least some of the metadata into coded digital audio data 113, e.g., as temporal frames of coded digital audio data, and a packetizer and packet sequencer 209 operative to accept the coded digital audio data 113, the classification 215, and any other metadata not included in the coded audio, to form a classification information element (IE) for the classification 215 for the audio data in a previous packet, and to packetize the temporal frames of coded digital audio data 113, previous-packet classification 215, and other metadata not included in the coded audio into packets, e.g., RTP packets to be sent as UDP in IP packets for transmission to a receive side over a communication link to which the transmit side is coupled. Thus, the packetizer and packet sequencer 209 includes a classification builder and IE builder 201 that buffers (stores) the classifications of packets with some identifying information to identify the packets the classifications apply to, and, for a present packet, is operative to retrieve such classifications applicable to one or more previous packets, build one or more classification IEs, and incorporate the classification IE(s) into the present packet. After buffering a classification and a packet identifying information therefor, at some later time, the previously buffered, i.e., previously stored classification(s) of audio data packetized into one or more previous packets is or are recalled, formed into one or more classification IEs, and packetized with the audio data of such later time.

One feature of embodiments of the invention is that packets containing audio data of a present temporal frame include information on the classification of at least one previous packet containing audio data of a past temporal frame. Stated differently, the classification of the audio data of a present packet is sent with a future packet, so that, if the present packet is lost, the receiver receiving the future packet and the classification data sent with such future packet will have the classification of the present packet that was lost.

In one version of the element 209, each respective delay between the present packet, and the one or more past packets whose classification(s) is or are sent with the present packet is a fixed respective delay. In another, each respective delay is varied as described further below.

The packetizer 209 includes a packet sequencer providing information sufficient for a receiver of the packets receiving the packets out-of-order to be able to re-order the packets into the correct order. As one example, the sequencer adds packet sequence numbers. In one embodiment, the classification IE containing the classification includes the sequence number of the packet whose classification information is included, while in another embodiment, the receiver side has sufficient information to determine the packet whose classification information is included. The resulting packets 217 contain audio and classification data.

In one embodiment, a packet sent by the transmit side includes, in addition to the classification of at least one packet in the past, its own classification or that of a neighboring recent packet, e.g., the immediately preceding packet.

In one embodiment, the packets are Real Time Transport (RTP) packets sent as UDP packets using the Internet Protocol. The classification IE is added to the RTP packet as is usual for adding additional information elements into packets. In the case of audio, the packetization depends on the type of audio coder 107, which is normally the coding part of a codec. Table 1 shows characteristics of the audio encodings using some well-known coding methods. The G series codecs (G722, etc.) refer to ITU-T recommendations. GSM and GSM

TABLE 1

Properties of Audio Encodings

| name of encoding | sample/frame | Bits per sample | sampling rate (Hz) | ms/ frame | Default ms/packet |
|---|---|---|---|---|---|
| DVI4 | sample | 4 | var. | N/A | 20 |
| G722 | sample | 8 | 16,000 | N/A | 20 |
| G723 | frame | N/A | 8,000 | 30 | 30 |
| G726-40 | sample | 5 | 8,000 | N/A | 20 |
| G726-32 | sample | 4 | 8,000 | N/A | 20 |
| G726-24 | sample | 3 | 8,000 | N/A | 20 |
| G726-16 | sample | 2 | 8,000 | N/A | 20 |
| G728 | frame | N/A | 8,000 | 2.5 | 20 |
| G729 | frame | N/A | 8,000 | 10 | 20 |
| G729D | frame | N/A | 8,000 | 10 | 20 |
| G729E | frame | N/A | 8,000 | 10 | 20 |
| GSM | frame | N/A | 8,000 | 20 | 20 |

TABLE 1-continued

Properties of Audio Encodings

| name of encoding | sample/frame | Bits per sample | sampling rate (Hz) | ms/ frame | Default ms/packet |
|---|---|---|---|---|---|
| GSM-EFR | frame | N/A | 8,000 | 20 | 20 |
| L8 | sample | 8 | var. | N/A | 20 |
| L16 | sample | 16 | var. | N/A | 20 |
| LPC | frame | N/A | 8,000 | 20 | 20 |
| MPA | frame | N/A | var. | var. | |
| PCMA | sample | 8 | var. | N/A | 20 |
| PCMU | sample | 8 | var. | N/A | 20 |
| QCELP | frame | N/A | 8,000 | 20 | 20 |
| VDVI | sample | var. | var. | N/A | 20 |

EFR refer to common cellular telephone codecs. For a full explanation of what these codecs are, the reader is referred to IETF RFC 3551, from which Table 1 is adapted. RFC 3551 is available 18 Jun. 2012 at www~dot~ietf~dot~org/rfc/rfc3551~dot~txt, where ~dot~ denotes the period (".") in the actual URL. In the table, "N/A" means not applicable, and "var." means variable. While most audio codecs are only specified for a fixed sampling rate, some sample-based algorithms (indicated by an entry of "var." in the sampling rate column of Table 1) may be used with different sampling rates, resulting in different coded bit rates. Those skilled in the art will understand that when data are used with a sampling rate other than that for which a static payload type is defined, non-RTP means must be used to define a dynamic payload type and must indicate the selected RTP timestamp clock rate, which is usually the same as the sampling rate for audio.

The communication link includes a packet network, e.g., an IP network 131. A receive side to which the packets from the transmit side are addressed is coupled to the network 131.

The receive side comprises a receive element 241 that includes a depacketizer, packet loss detector, decoder and packet loss concealer element operative to receive the IP packets sent by the transmit side, possibly out of order, and with some loss, and jitter, and to carry out depacketizing, packet loss detecting, decoding and PLC in order to determine from the received packets decoded temporal frames of digital audio data. The receive element 241 is operative to determine the classification information for previous packets from the classification IEs of packets that are received. A packet loss and classification statistics accumulator 243 is operative to determine packet loss and classification statistics 221, e.g., a measure of the average packet loss rate determined over a pre-determined time period for each of the packets for which those classifications that have impact on perceptual voice quality are applicable, the statistics usable to calculate a measure of perceptual audio quality. In the case the impact of the classification is to a neighboring packet rather than the classified packets, the accumulating of classifications and packet loss statistics associated with the classifications is for lost packets whose loss has the applicable impact. In one embodiment, the packet loss and classification statistics accumulator 243 aggregates packet loss event. In some versions, receive element 241 is also operative to determine other information 123 usable to calculate the measure of perceptual audio quality.

The receive side also includes an audio reconstructor 147 operative to generate an audio signal for reproduction, e.g., by a loudspeaker from the decoded temporal frames of digital audio data. The receive side also includes a perceptual quality calculator 245 operative to calculate a measure of perceptual voice quality 223 for the communication system 200 using the packet loss and classification statistics 221, and in some versions, the other information 123 to calculate a measure of perceptual voice quality 225.

It would be clear to those in the art that because the classification sent with a current packet is applicable to one or more previously sent packets, a delay corresponding to a period of time, e.g., in element 243, is involved in constructing statistics and/or other information on the packets that are lost and the classifications applicable to such packets. Therefore, the measure of perceived quality that is calculated is for packets in the past. This is not usually a problem. In the case of a voice call, the measure of perceptual quality may be determined over a whole call, not small segments thereof. The measure may be determined, for example, for 5-minute periods of the call, not, for example, for 1-second periods.

Note that in a typical VoIP system, each endpoint contains both elements of a transmit side for sending voice data and elements of a receive side for receiving packets containing voice data. However, for simplicity, only one transmit side at one end, and one receive side at the other end are shown.

Figures 3A, 3B:
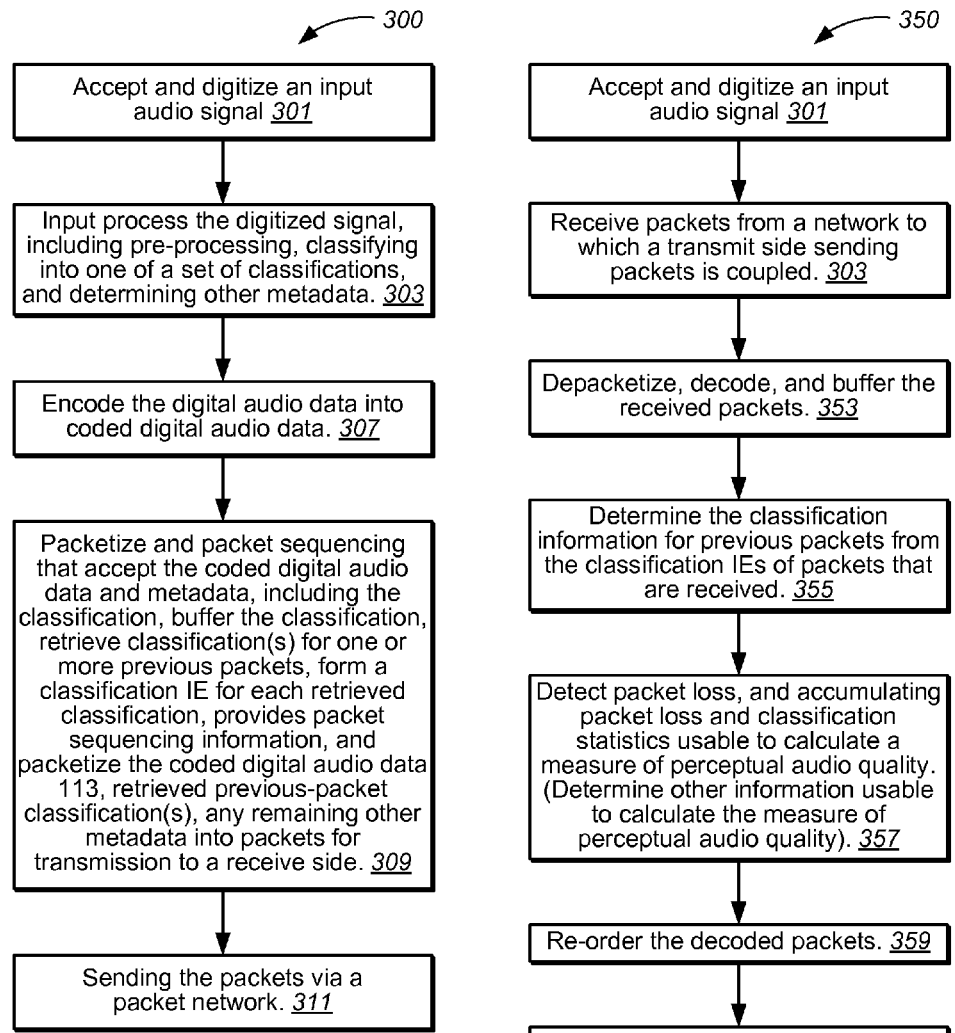
FIG. 3A shows a simplified flow chart of an embodiment of a transmit side process that is carried out by a transmit side embodiment of the present invention.
FIG. 3B shows a simplified flow chart of an embodiment of a receive side process that is carried out by a receive side embodiment of the present invention.

FIG. 3A shows a simplified flow chart of an embodiment of a transmit side process 300 that is carried out by the transmit side of an embodiment of the present invention, e.g., carried out by the transmit side of the communication system 200 shown in FIG. 2, and FIG. 3B shows a simplified flow chart of an embodiment of a receive side process 350 that is carried out by the receive side of an embodiment of the present invention, e.g., carried out by the receive side of the communication system 200 shown in FIG. 2.

Transmit side process 300 comprises, in 301, accepting an audio signal 103, and digitizing the signal, and, in 303, input processing the digitized signal, including pre-processing, the pre-processing including determining metadata to embed with digital audio data. Process 300 includes a classifying process, in one version as part of input processing 303, and in another as a separate step. The combination of the input processing and classifying determines digital audio data in a form for coding, classifies the digital audio data into one of a set of classifications, different classifications of the set indicative of different impacts that a lost packet containing the digital audio data (or the loss of one or more neighboring packets) would have on the perceptual voice quality, and also determines any other metadata for inclusion with packets to be sent. Process 300 further comprises in 307 coding to encode the digital audio data, e.g., with at least some of the metadata, into coded digital audio data 113, e.g., as temporal frames of coded digital audio data. Process 300 further comprises, in 309, a packetizing and packet sequencing process that accept the coded digital audio data 113 and the classification 215, buffers the classification, e.g., with packet identification information therefor, retrieves classification(s) for one or more previous packets, forms a classification IE for the retrieved classification of the audio data in the one or more previous packets, and provides packet sequencing information, and packetizes the temporal frames of coded digital audio data 113, the retrieved previous-packet classification(s) 215, and any remaining metadata not included with the coded data into packets, e.g., IP packets for transmission to a receive side over a packet network to which the transmit side is coupled. Process 300 further comprises in 311 sending the packets via packet network 131.

Thus, the classification of the audio data of a present packet is sent with a future packet, and a present packet is sent together with the classification(s) of one or more previous packets. The delay(s) between a present packet the packet or packets for which classification(s) is or are included in the present packet is or are fixed, or varied according to a delay method.

At a receive side, receive side process 350 comprises, in 351, receiving packets from a network, e.g., network 131 to which the receive side is coupled, including packets sent by the transmit side, possibly out of order, and, for received packets sent by the transmit side, in 353, depacketizing, decoding, and buffering the received packets, the buffering in order to re-order packets that are out-of-order. Process 350 further comprises, in 355, determining the classification information for previous packets from the classification IEs of packets that are received. Process 350 further comprises, in 357 detecting packet loss, and accumulating statistics 221 on packet loss and classification of packets that are lost, e.g., for each of those classifications that have impact on perceptual voice quality, the packet loss statistics and/or other information usable to calculate a measure of perceptual audio quality. Packets not received within a pre-defined time are regarded as lost packets. An example of packet loss statistics includes a measure of the average packet loss rate determined over a pre-determined time period for each of those classifications that have impact on perceptual voice quality. In some versions, receive side process 350 includes in 357 determining other information 123 usable to calculate the measure of perceptual audio quality. This is shown in parentheses in FIG. 3B.

Process 350 further comprises, in 359 re-ordering the packets. Receive side process 350 further includes in 361 reconstructing audio to generate an audio signal for reproduction, e.g., by a loudspeaker from the decoded temporal frames of digital audio data. The receive side process also includes in 363 calculating a measure of perceptual voice quality 223 using the statistics 221 on packet loss and classification of packets that are lost, and in some versions, the other information 123 to calculate a measure of perceptual voice quality 225.

Figure 4:
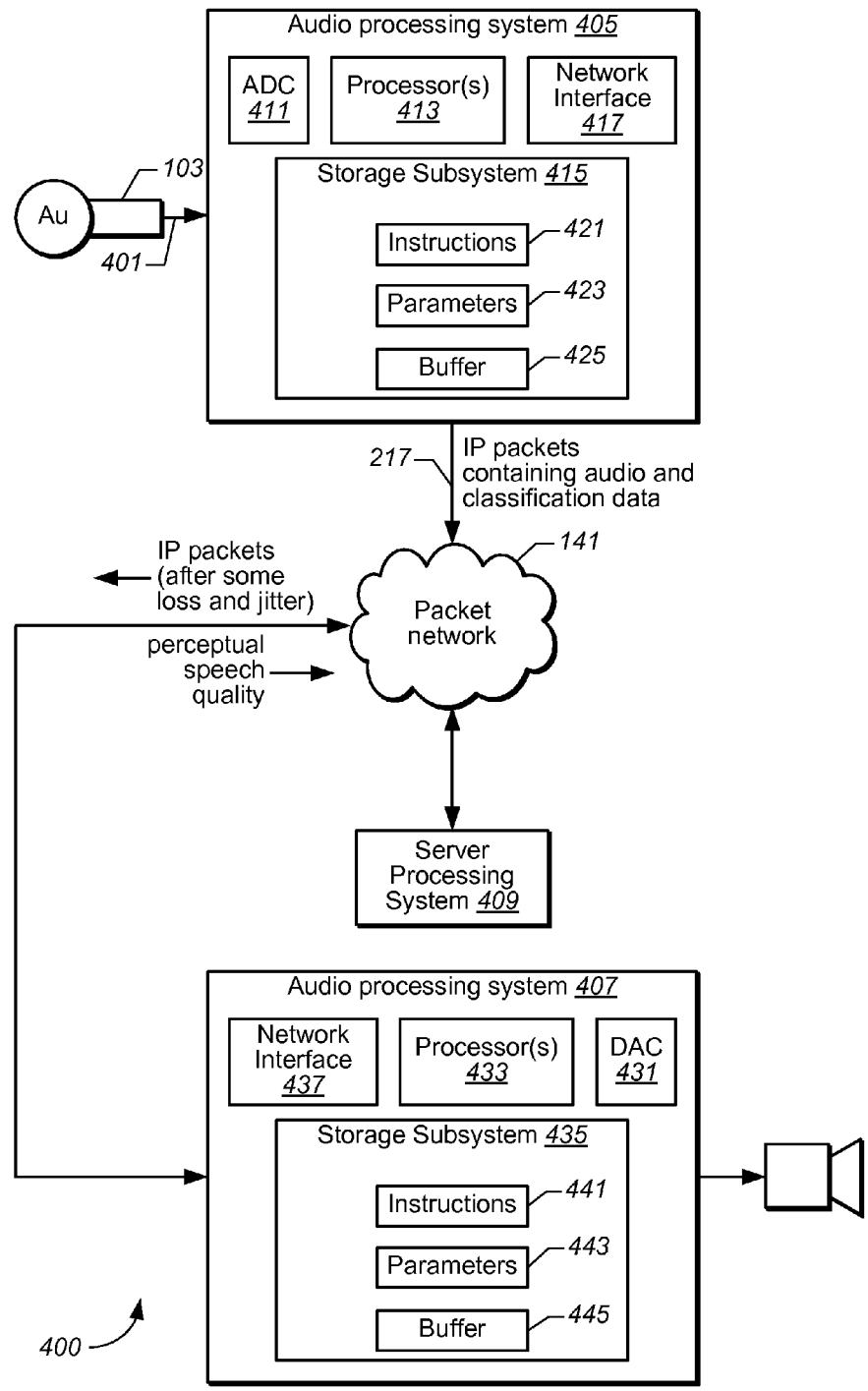
FIG. 4 shows a simplified block diagram of one embodiment of the communication system of FIG. 2 that, in this version, includes a respective audio processing system with one or more processors at each of the receive and transmit sides.

FIG. 4 shows a simplified block diagram of one embodiment 400 of the communication system 200 of FIG. 2 that, in this version 400 includes an audio processing system 405 at the receive side for carrying out the receive side processes of FIG. 3A, corresponding also to the processes carried out by elements 205 (including 207), 107, 209 (including 201) for processing an audio input signal 401, e.g., from a microphone. Processing system 405 includes an analog-to-digital converter (ADC) 411 that includes a quantizer to digitize the audio input signal 401, and at least one processor 413. The processing system 403 also includes a storage element, e.g., a storage subsystem 415 typically including one or more memory elements. The processing system 405 also includes a network interface 417 operative to couple the processing system 405 to a packet network, shown as packet network 141. The elements of the processing system 405 are coupled, e.g., by a bus subsystem or some other interconnection mechanism not shown in FIG. 4. Some of the elements of processing system 403 may be integrated into a single circuit, using techniques commonly known to one skilled in the art.

The storage subsystem 415 includes instructions 421 that when executed by the processor(s) 405, cause carrying out of one of the methods described herein in FIG. 3A, the description thereof, and elsewhere. Different versions of the instructions carry out different method embodiments described herein, including variations described herein.

In some embodiments, the storage subsystem 415 is operative to store one or more parameters 423, that can be used to vary some of the processing steps carried out by the processing system 405. The storage subsystem 415 also includes at least one buffer 425, e.g., to buffer packet classifications, including, e.g., packet identification information for classified packets.

The audio processing system 405 is operative to send packets, e.g., IP packets to a receive side, the packets containing audio and classification data.

The system 405 shown in FIG. 4 can be incorporated in a specialized device such as a headset, e.g., a wireless Bluetooth headset, or a cellular telephone, or in a teleconference system, or in another end point. Furthermore, the functionality may be split up amongst several devices, some of which include at least one processor and storage. The system also can be part of a general-purpose computer, e.g., a personal computer operative to process audio signals.

FIG. 4 also shows, at a receive side, another audio processing system 407 coupled to network 141 for receiving IP packets sent from the transmit side and carrying out the processes shown in FIG. 3B, e.g., referring to FIG. 2, the processes carried out by elements 241 (including 243), 147, and 245.

Processing system 407 includes a network interface 437 operative to couple the processing system 407 to a packet network, e.g., network 141, and at least one processor 433, which can be the processing unit(s) of a digital signal processing (DSP) device, or a core of an application-specific integrated circuit or other chip that includes other functionality, or a central processing unit (CPU) of a more general purpose processing device. The processing system 407 also includes a storage element, e.g., a storage subsystem 435 typically including one or more memory elements. The processing system 407 also includes a network interface 437 operative to couple the processing system 407 to a packet network, shown as packet network 143 and to digital-to-analog converter (DAC) 431 to reconstruct an audio output signal from the decoded digital data from received packets. The elements of the processing system 407 are coupled, e.g., by a bus subsystem or some other interconnection mechanism not shown in FIG. 4.

The storage subsystem 435 includes instructions 441 that when executed by the processor(s) 407, cause carrying out of one of the methods described herein in FIG. 3A, the description thereof, and elsewhere. Different versions of the instructions carry out different method embodiments described herein, including variations described herein.

In some embodiments, the storage subsystem 435 is operative to store one or more parameters 443, that can be used to vary some of the processing steps carried out by the processing system 407. The storage subsystem 435 also includes at least one buffer 445, e.g., to buffer packet classifications, including, e.g., packet identification information for classified packets.

The audio processing system 407 is operative to receive packets, e.g., IP packets from the transmit side and to produce the audio output signal, and a measure of perceptual audio quality for the communication between 405 and 407. In the embodiment shown, audio processing system 407 is operative to packetize the measure of perceptual audio quality and send the packets containing the measure of perceptual audio quality to network 141 to another processing system, shows as server processing system 409 in FIG. 4.

Each set of elements of each of processing systems 407 and 407 may be integrated, each into a respective single circuit, using techniques commonly known to one skilled in the art. The one or more processors 413, or similarly processor(s) 433 can be the processing unit(s) of a respective digital signal processing (DSP) device, or a respective core of an application-specific integrated circuit or other chip that includes other functionality, or a central processing unit (CPU) of a more general-purpose processing device.

In one system, processing systems 405 and 407 can be different instantiations of the same system, that is, processing systems 405 can include additional elements of system 407, such as the DAC 431, and, software instructions 441 and buffers 445 in storage subsystem 415, so that it can also carry out the processes of FIG. 3B, and similarly, processing system 407 can include additional elements of system 405, such as the ADC 411, and, software instructions 421 and buffers 425 in storage subsystem 435, so that it can also carry out the processes of FIG. 3A.

As would be clear to one skilled in the art, the system of FIG. 4 can be expanded to include other forms of media, and to include endpoints that each can carry out both receive and transmit functions.

Such audio processing systems 405 and 407, possibly combined as a single audio processing system, may be included, for example, in a headphone set for IP telephony, or in a Bluetooth headset or in an end-point of a teleconferencing system that carries out voice communication. In some embodiments, the audio input 401 is digitized by ADC 411 into temporal frames of a number samples of sampled data.

Furthermore, alternate embodiments of processing system 405 may exclude the ADC and accept audio data in digital form. Furthermore, alternate embodiments of processing system 407 may exclude the DAC and provide digital audio output.

Classification

One feature of embodiments of the invention is assigning, at a receive side of a communication link, one of a set classifications to media, e.g., voice/audio packets transmitted in a sequence. In one embodiment this is carried out in classifier 207 of input processor 205 and input process 303. The classifying includes analyzing the data that forms the content portion of the packet and assigning a classification to the content. In one embodiment, the analyzing and classifying is carried out on a temporal frame-by-frame basis, where in the case of audio, e.g., voice, in one embodiment, a temporal frame corresponds to 20 ms, and in other embodiments for audio, values between 5 ms and 60 ms can be used. The set of classifications are selected so that different classifications are indicative of different impacts a lost packet containing all or some of the temporal frame of audio data (or one or more neighboring packets) would have on the perceptual voice quality.

In some embodiments, classifying an amount of digitized media data comprises extracting one or more features from the amount of digitized media data, e.g., frame of samples. The classifications typically reflect at least one of a perceptual characteristic and an informational content characteristic of the amount of digitized media data.

While some examples of sets of classifications, classification methods, and related methods of calculating a measure of the perceptual quality are provided herein, it is important to note that the present invention is not limited to any particular set of classifications or to any classification method, so long as the classification of any packet is indicative of the relative impact on a measure of perceptual content quality the loss may have of such a packet, or, for some possible classifications, one or more neighbors of the packet. Many such methods are available, as would be clear to those skilled in the art.

Different embodiments of classifier 207 use a set having a different number of classifications. The number of classifications may depend on the requirement of the perceptual quality calculator 245 and the process 363 the calculator carries out. The number of classifications also may be limited by complexity constraints. Even if the calculator 245 can accept more classifications than are provide by a particular classifier 207 or classification process, or by the number of bits assigned at the transmit side to classification information, the perceptual quality calculator 245 and the process 363 can typically still provide an improved quality estimation compared to that which would be carried out by a quality calculator that does not use any classification data.

In one embodiment, each classification in the set of classifications is given an m-bit code. In one embodiment, the code identifies the ranking of importance as to the impact a lost packet (or one or more neighboring packets) might have on the quality. In one embodiment, the ranking is from 0 to a number less than or equal to $2m-1$, dependent on m, the number of bits used for the classification information.

One embodiment uses 1 bit. Another embodiment uses 2 bits, to up to 4 classifications, and yet another embodiment uses 3 bits, to up to 8 classifications. Other embodiments include assigning a variable number of bits to the classifications, the bit length assigned to a classification being according to the likelihood of occurrence of such a classification. In this manner, the average number of bits assigned to the classification information for a set of classifications is reduced from an embodiment in which a fixed number of bits is assigned to encode all possible classifications of the set.

A first embodiment uses one bit: whether a particular packet is important or not. In one such version, the classification of packets is into one of two categories, as determined by whether a measure of the energy in the audio signal in the packet, e.g., the RMS values of the signal encoded in a packet is above or below a pre-defined (and settable) threshold value.

Using this classification, in one embodiment, the perceptual quality calculator 245 determines a measure of perceptual voice quality 225 using a modified average packet loss rate, APLR' that considers only packets that were classified with a RMS values above the pre-defined threshold value. This results in an improved quality measure, in MOS units, as $$MOS=f(APLR').$$

In one version, f(•) is a linear function, e.g., $$MOS=\beta-\alpha\ APLR',$$

where $\alpha$ is a positive constant, e.g., 0.125, or some other suitable value for APLR' being in units of percent, and $\beta$ is either a constant that, if there were and no packets loss, would equal a "perfect" MOS, e.g., 4.55, or a function of other parameters 123, that, if there were no degradations and no packet loss, would equal a MOS of 4.55.

A second embodiment of classification uses 2-bits. Packets that have a measure of the energy in the audio signal encoded in the packet, e.g., an RMS value of the signal encoded in a packet below a pre-defined (and settable) threshold value are given a first classification, e.g., 0. The remaining packets are classified into two classes, e.g., 01 or 10, depending on whether the audio signal encoded in the packet corresponds to a voiced or unvoiced speech segment. A PLC method operating at the receive side may be effective concealing voiced speech segments, and less effective concealing unvoiced speech segments. Accordingly, packets corresponding to an audio signal whose energy is above a pre-defined threshold may be classified as carrying voiced and unvoiced speech.

At the receive side, packet loss rates are accumulated separately for voiced and unvoiced speech, denoted by $APLR_v$ and $APLR_{uv}$, respectively. In one embodiment, the perceptual quality calculator 245 determines a measure of perceptual voice quality 125 using the two packet loss rates, $APLR_v$ and $APLR_{uv}$ that considers only packets that were classified with a RMS values above the pre-defined threshold value. This results in an improved quality measure, in MOS units, as $$MOS=f_2(APLR_v, APLR_{uv}),$$

where $f_2(•,•)$ is a pre-defined function of $APLR_v$ and $APLR_{uv}$. In one version, $f_2(•,•)$ is a combination of linear functions, e.g., $$MOS=\beta-\alpha_v APLR_v-\alpha_{uv}APLR_{uv},$$

where $\alpha_v$ and $\alpha_{uv}$ are positive constants, e.g., $\alpha_v$=0.05, and $\alpha_{uv}$=0.1 for each of $APLR_v$ and $APLR_{uv}$, being in units of percent, and $\beta$ denotes a MOS value when no packets are lost, e.g., 4.55 if there are no other degradations. In another embodiment, $\beta$ is a function of other degradations, e.g., the other information 123.

Those in the art will recognize that this can be extended to a set of more classifications that are considered useful to the calculation of perceptual voice quality.

One embodiment uses a set consisting of eight classifications. Table 2 below shows such a set of eight classifications, their respective names, respective descriptions, and respective three bit values (expressed in octal) that are assigned to the classifications in one embodiment.

Note that some of the classifications may be simultaneously derived by the classifier 207.

Such classifications are determined in the input processing, e.g., the pre-processing. In fact, in some audio processing systems, similar classifications may already be determined and in use for the control of the signal processing and any intelligent methods running on the microphone input or other input.

One example includes the input processing using a voice activity detector (VAD) carrying out a VAD process operative to determine a binary or probabilistic indicator of the presence of voice in a signal containing a mixture of voice and noise. Such use of voice activity detection methods are known for improving the performance of speech recognition, or for controlling a decision to transmit a signal in systems benefitting from an approach to discontinuous transmission. Voice activity detection is also used for controlling signal processing functions such as noise estimation, echo adaption and specific algorithmic tuning

TABLE 2

| Classification | Description | 3 bit value |
| --- | --- | --- |
| Benign | A packet that if clipped entirely from the signal—that is replaced with silence—would have very little impact on the subjective link quality. | 0 |
| ShortFill | A packet that if it were to be a single packet loss, the PLC method would do a good job of covering it up so that the loss is close to imperceptible. | 1 |
| MidFill | A packet that if there were 2-5 packets missing in sequence, the PLC would do a reasonable job. | 2 |
| Frictave | A noise-like packet (very coarse phonetic classifications) | 3 |

TABLE 2-continued

| Classification | Description | 3 bit value |
|---|---|---|
| Mixed | A packet that has the characteristics of mixed voiced and unvoiced sound, also called partially voiced sound. | 4 |
| Formant | A packet having high harmonicity or close to periodic. | 5 |
| FadeOut | A packet that is part of a natural phrasing fade out. Packets after it can be lost, and a PLC will not invoke if a loss happens here. | 6 |
| Critical | A packet or temporal frame that if lost will cause perceptibly lower quality. | 7 | such as the filtering of gain coefficients in noise suppression systems. The output of voice activity detection may be used directly for subsequent control, for metadata, and/or be used to control the nature of audio processing algorithms working on the real time audio signal.

Some embodiments of the present invention use voice activity detection in classifier 207 for determining one of a set of classifications of the audio embedded in a packet. Many methods are known for VAD, and one or more such methods can be used in classifier 207 and the process carried out thereby.

One VAD method operates on temporally sequential temporal frames, and includes determining two or more features that characterize aggregately two or more of the sequential audio temporal frames that have been processed previously within a time period that is recent in relation to a current point in time. The feature determination exceeds a specificity criterion and is delayed in relation to the recently processed audio temporal frames. A high sensitivity short term VAD method includes detecting an indication of voice activity in the audio signal based on a decision that exceeds a preset sensitivity threshold and that is computed over a time period that is brief in relation to the duration of each of the audio temporal frames. The decision relates to one or more features of a current audio signal temporal frame. The VAD method further combines the high-sensitivity short-term VAD detection and the recent high specificity audio temporal frame determination and information that relates to a state, which is based on a history of one or more previously computed feature determinations that are compiled from a plurality of features that are determined over a time that is prior to the recent high specificity audio temporal frame feature determination time period. The VAD method includes outputting a decision relating to a commencement or termination of the audio signal based on the combination. In one version, the combining includes combining one or more signals or determinations that relate to a feature that comprises a current or previously processed characteristic of the audio signal. In one version, the state relates to one or more of a nuisance characteristic or a ratio of voice content in the audio signal to a total audio content thereof. One version also includes analyzing the determined features that characterize the recently processed audio temporal frames, based on the determined features analysis, inferring that the recently processed audio temporal frames contain at least one undesired temporal signal segment, and measuring a nuisance characteristic based on the undesirable signal segment inference. The high specificity previous audio temporal frame feature determination, in one version, includes a ratio or a prevalence of desired voice content in relation to the undesired temporal signal segment. One version further includes computing a moving statistic that relates to the desired voice content ratio or prevalence in relation to the undesired temporal signal segment.

Of course, those in the art will recognize that other VAD processes may be used.

One embodiment further includes determining whether the audio corresponds to a fade in or a fade out. It is known that fade ins and fade outs have different impacts on calculating the perceptual measure of quality.

In different embodiments, the classification process depends at least one of: signal energy, recent voice activity, nuisance, and context. An example of context is how important a voice is in a particular conference.

In some embodiments, some classifications require more than one packet's worth of digital media data. In one such embodiment, the classifying is based on an amount of digitized media that corresponds to more than one packet, and comprises accepting the amount of digitized media data, determining a classification of a set of classifications for the amount of digitized media data, storing the determined classification such that it may be retrieved for inclusion with data of future packets of the stream, and packetizing the amount of digitized media data into more than one packet of the ordered stream of packets (as distinct from the case of the amount of data corresponding to what included in one packet). The packetizing includes embedding or otherwise including with each packet containing any of the amounts of digitized media a previous classification that was stored for a previous packet that is a time period earlier in the ordered stream of packets.

Simple Robust Lost Packet Classification Reconstruction

Figure 5:
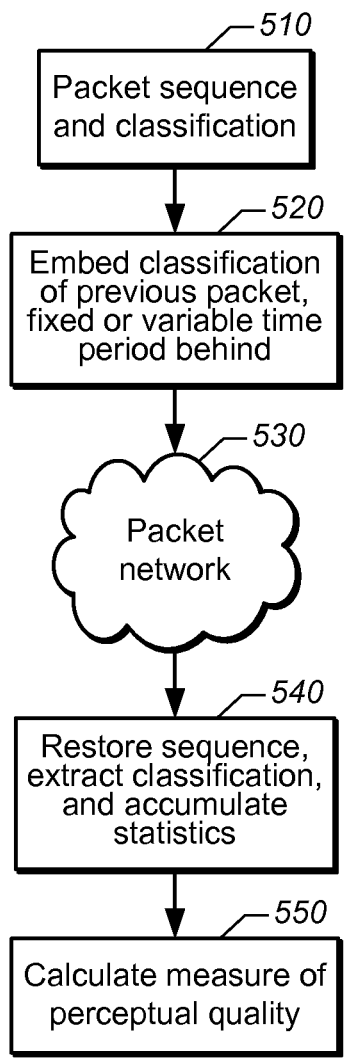
FIG. 5 shows the data flow of the classification according to embodiments of the present invention.

One aspect of the present invention is how the classification information determined at the transmit side is sent to the receiving end, noting that the classification information is applicable for packets that may actually be lost. FIG. 5 shows the data flow of the classification through a packet network 530 according to embodiments of the present invention. After packet sequence and classification (510), the classification of a previous packet is sent in with a present packet that is sent as part of the stream of packets that are sent (520). In one set of embodiments, the time relationship between the present packet and the packet whose classification is sent in or with the present packet may be a fixed amount of time. In another set of embodiments, the time relationship between the present packet and the packet whose classification is sent in or with the present packet is varied, so that not all packets are sent with the classification of the same time period back. At the receive side, this classification is extracted (540) and applied to the appropriate packets or loss information of such packets, and then used to calculate a measure of perceptual quality (550). It would be clear to one skilled in the art that the extracting of the classification at the receive side includes a delay, e.g., buffering, together with identifying which packet or packets the classification applies to. In the case that the impact of the classification is to a neighboring packet rather than the classified packets, the accumulating of classifications and packet loss statistics associated with the classifications is for lost packets whose loss has the applicable impact. An example of such a classification is "FadeOut" shown in Table 2. Packets after the packet classified as fade out may be lost with little impact on the perceived quality.

Fixed Stride

In the first set of embodiments, the time relationship between the present packet and the packet whose classification is sent in or with the present packet is a fixed amount of time, or equivalently, a fixed number of temporal frames or packets. See Table 1 above for the relationships of time to packets or frames for some common codecs. In each packet, in addition to the coded audio and any associated metadata, the receive side appends a single classification, e.g., in a classification IE for the packet of a temporal frame that was N temporal frames earlier in the sequence packets. The packet loss and classification information statistics accumulator 243 has to wait at least a number, denoted N of temporal frames' worth of packets after any given packet loss event to collect the classification information about the packet or packets of the temporal frames or packets that are lost. In typical packets of 20 ms of audio, typical values for N would correspond to time periods of several seconds, e.g., from 1 to 5 s, so 50 to 250 packets of 20 ms of audio each. One embodiment uses 2 sec (100 20 ms packets).

In one embodiment, the number of temporal frames, N, is settable. This number can be sent to the receive side in a header, or in the classification IE, or otherwise, or can be pre-defined.

It is evident that this approach is simple and effective for packet loss bursts that are up to a time corresponding to N temporal frames or packets.

It should be notes that this approach has a failure mode; if the system has some cadence or periodic interruption aligning with the time period of N temporal frames or packets, information about the classification of lost packets may not be available. The measure of perceptual quality may still be reasonable based only on the packet loss statistics directly. Using a variable stride for the delay between a current packet and the packet whose classification information is sent in or with the current packet avoids this failure mode.

Variable Delayed Classification

In another set of embodiments, the time relationship between the present packet and the packet whose classification is sent in or with the present packet is varied, so that not all packets are sent with the classification of the same time period back.

One version of the second set of embodiments includes embedding in or sending with a packet with an odd sequence number the classification of a packet that is a first time period, denoted To before the present packet, corresponding to a first number of packets back, and embedding in or sending with a packet with an even sequence number the classification of a packet that is a second time period, denoted Te before the present packet, corresponding to a second number of packets back, where the first number of packets and the second number of packets, respectively corresponding to To and Te, have the same parity, i.e., are both even or both odd. Typical values for Te and To are in the range of a second to seconds of audio, so between a hundred and several hundred packets of 20 ms of audio each. In other embodiments, a range of delays with some permutation function is used. The difference in the two delays or delay range should be larger than any expected correlation or burst length of packet loss. A range of 1-2 s is suggested. In one embodiment with two delays, one for odd sequence numbers, the other for even sequence numbers, delays of 1.4 s and 2.2 s (70 and 110 packets of 20 ms) are used. Note that there is some value in avoiding a difference or actual delays that are simple multiples of any synchronous or repetitive process that may be expected on the network. Although rare, this can cause a significant failure of some embodiments. The values specified for the 1.4 s and 2.2 s delays avoid an interval or simple multiple of 1 s.

Alternate embodiments use other algorithmic methods of varying the delay. In one set of embodiments, the delay is varied from packet to packet in a manner that appears random, i.e., a random-like manner. In one such set of embodiments, the delay is a function of the sequence number of the packet in or with which a classification is embedded. One such random-like manner is using a maximum length sequence of some length, denoted m of bits. There are $2m-1$ such sequences, each representing an m-bit number. In one such method, the sequence number of a packet, denoted n is truncated to be modulus $2m-1$, and the delay is the $n \bmod (2m-1)$'th binary number of a maximum length sequence.

In yet another method, a set of least significant bits in the packet sequence number is used in a bit reversed manner to provide a delay index that covers all of the possible packets in a past section of the transmission sequence number. In one such embodiment using the bit reversal permutation, the range of delays is expressed as 1.4 s to 2.66 s having a specific set of 64 packets of 20 ms to facilitate a 6-bit field reversal.

Those skilled in the art would recognize that many methods of determining a delay indicative of the time relationship between the present packet and the packet whose classification is sent in or with the present packet.

In the case of a deterministic function of the sequence number being used at the transmit side to determine the delay, the receive side can determine the sequence number of the packet whose classification is carried in a particular packet without need for the delay being sent to the receive side with a packet.

In yet another embodiment, the delay is included with the classification IE sent with a particular packet. In such an embodiment, any method of producing a random-like delay, e.g., a simple random number generator can be used, as the receive side receives the delay in the classification IE, and does not need to reconstruct the delay.

The Perceptual Quality Calculator

The invention is not limited to any particular perceptual quality calculator 245 or calculation method 363. One feature of the present invention is that the measure of perceptual quality determined by a perceptual quality calculation method that uses information on packet loss can be improved by taking into account, in the calculation, information on the content in the packets that are lost, such information on any particular packet provided by determining a classification of a set of classifications for the particular packet at the transmit side, and sending the determined classification with a later packet, according to an embodiment of the present invention.

Two simple examples are described herein above in the section titled "Classification." A first method is applicable for a binary classification, in which only packets classified in one way are considered as having impact, if lost, to the perceptual quality, e.g., only packets that were classified has having a respective RMS value above the pre-defined threshold value. Calculator 245 determines a measure of perceptual voice quality 225 using a modified average packet loss rate, APLR' that considers only such packets, and determines a quality measure, in MOS units, as MOS=f (APLR'). In one version, f(•) is a linear function, e.g., MOS=$\beta-\alpha$APLR', where a is a positive constant, e.g., 0.125 for APLR' in percent, and $\beta$ is either constant defining a MOS value when no packets are lost, e.g., 4.55, or a function of other information 123, arranged so that if there are no degradations and no packet loss, $\beta$=4.55. The second example is applicable to a classification that uses 2-bit, e.g., packets that have a measure of the energy in the audio signal encoded in the packet, e.g., an RMS value of the signal encoded in a packet below a pre-defined (and settable) threshold value are given a first classification, e.g., 0. The remaining packets are classified into two classes, e.g., 01 or 10, depending on whether the audio signal encoded in the packet corresponds to a voiced or unvoiced speech segment. A PLC method operating at the receive side may be effective concealing voiced speech segments, and less effective concealing unvoiced speech segments. Accordingly, packets corresponding to an audio signal whose energy is above a pre-defined threshold are classified as carrying voiced and unvoiced speech. At the receive side, packet loss rates are accumulated separately for voiced and unvoiced speech, denoted by APLRv and APLRuv, respectively. In the second example, the perceptual quality calculator 245 determines a measure of perceptual voice quality 125 using the two packet loss rates, APLRv and APLRuv that considers only packets that were classified has having a respective RMS value above the pre-defined threshold value. This results in an improved quality measure, in MOS units, as MOS=f2 (APLRv, APLRuv), where f2(•,•) is a pre-defined function of APLRv and APLRuv. In one version, f2(•,•) is a combination of linear functions, e.g., MOS=$\beta$–$\alpha$v APLRv–$\alpha$uv APLRuv, where $\alpha$v and $\alpha$uv are positive constants, e.g., $\alpha$v=0.05, and $\alpha$uv=0.1 for each of APLRv and APLRuv being in units of percent, and $\beta$ denotes a MOS value when no packets are lost, e.g., 4.55 if there are no other degradations. In another embodiment, $\beta$ is a function of other degradations, e.g., the other information 123.

From these examples, it would be clear to those skilled in the art that other methods of calculating a measure of the perceptual quality using statistics and/or other information on packets lost may be modified to incorporate not just the statistics and/or other information on packets lost, but also classifications of packets that are lost, in particular, statistics on different classifications on packets that are lost to provide an improved measure of perceptual quality using an embodiment of the present invention. Such methods of calculating a measure of the perceptual quality also may use one or more other items of information 123. Furthermore, new methods of calculating a measure of perceptual quality may be designed that use statistics of differently classified lost packets, to take advantage of features of the present invention.

Redundancy

Note that the information at the receiver is not perfect. Packets that contain information about previous packets also may be lost. In alternate embodiments, redundancy in the transmission of the data that indicate the classification is used. In one example, a present packet includes two classification IEs, each with the classification of a different respective previous packet, such that the classification of any packet is sent on average with more than one packet. One example of this is using variable delay methods, e.g., two random-like delays, each determined by a method as described above in the Section "Variable delayed classification," each delay sending a classification IE with the classification of one previous packet. Yet another embodiment includes the classification of the present or neighboring recent packet, such that three classifications are included with each packet.

In another alternate embodiment of adding redundancy, the data that indicate classification, e.g., the classification IE, includes a redundancy, to ensure correct transmission.

Such methods would provide additional robustness for the case of high packet loss, and would enable determining the classification of lost packets even when there is high packet loss. However, the random-like variable methods described above in the Section "Variable delayed classification," are probabilistically so robust that in the case of relatively small packet losses, when it is most important to obtain a good measure of the perceptual quality for the communication link, e.g., as determined by a MOS value, no additional benefit is gained by having redundancy. In high packet loss, where redundancy could be beneficial, e.g., for cases of at least 20% packet loss, the quality of the voice link is degraded to such an extent that the measure of perceptual voice quality of voice may no longer be important.

Additional Notes

Note that no test data are inserted in the transmitting side in order to determine what happens to the test data, as in so called "active monitoring." Furthermore, note that as an alternative to the methods described herein, one could classify packets and send the immediately adjacent (previous) classification in each packet. This would not work well for bursts. That is, it is known that packet loss is in practice likely to occur in runs, so that adding information about a particular packet to an immediate neighboring packet may still cause the information to be lost if the particular packet is lost. Therefore, one feature of embodiments of the invention includes adding the classification information about a particular packet to one or more packets some distance in the future.

Note also that embodiments of the present invention can be extended by inferring the classification of a lost packet from surrounding packets and analysis.

Note also that while embodiments of the present invention include sending the classification information of a particular packet later on the same link, embedded in a future packet, the additional information can also be sent separately in a more robust data link. This creates complexity and the requirement to reconstruct larger sequences, and also requires the establishment of a reliable network link (e.g., TCP) instead of just datagrams (UDP).

General

Unless specifically stated otherwise, it is appreciated that throughout the specification discussions using terms such as "generating," "processing," "computing," "calculating," "determining" or the like, may refer to, without limitation, the action and/or processes of hardware, e.g., an electronic circuit, a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., of such steps is implied, unless specifically stated.

The methodologies described herein are, in some embodiments, performable by one or more processors that accept logic, instructions encoded on one or more computer-readable media. When executed by one or more of the processors, the instructions cause carrying out at least one of the methods described herein. Any processor capable of executing a set of instructions (sequential or otherwise) that specify actions to be taken is included. Thus, one example is a typical processing system that includes one or more processors. Each processor may include one or more of a CPU or similar element, a graphics processing unit (GPU), field-programmable gate array, application-specific integrated circuit, and/or a programmable DSP unit. The processing system further includes a storage subsystem with at least one storage medium, which may include memory embedded in a semiconductor device, or a separate memory subsystem including main RAM and/or a static RAM, and/or ROM, and also cache memory. The storage subsystem may further include one or more other storage devices, such as magnetic and/or optical and/or further solid state storage devices. A bus subsystem may be included for communicating between the components. The processing system further may be a distributed processing system with processors coupled by a network, e.g., via network interface devices or wireless network interface devices. If the processing system requires a display, such a display may be included, e.g., a liquid crystal display (LCD), organic light emitting display (OLED), or a cathode ray tube (CRT) display. If manual data entry is required, the processing system also includes an input device such as one or more of an alphanumeric input unit such as a keyboard, a pointing control device such as a mouse, and so forth. The term storage element, storage device, storage subsystem, or memory unit as used herein, if clear from the context and unless explicitly stated otherwise, also encompasses a storage system such as a disk drive unit. The processing system in some configurations may include a sound output device, and a network interface device.

In some embodiments, a non-transitory computer-readable medium is configured with, e.g., encoded with instructions, e.g., logic that when executed by one or more processors of a processing system such as a digital signal processing (DSP) device or subsystem that includes at least one processor element and a storage element, e.g., a storage subsystem, cause carrying out a method as described herein. Some embodiments are in the form of the logic itself. A non-transitory computer-readable medium is any computer-readable medium that is not specifically a transitory propagated signal or a transitory carrier wave or some other transitory transmission medium. The term "non-transitory computer-readable medium" thus covers any tangible computer-readable storage medium. Non-transitory computer-readable media include any tangible computer-readable storage media and may take many forms including non-volatile storage media and volatile storage media. Non-volatile storage media include, for example, static RAM, optical disks, magnetic disks, and magneto-optical disks. Volatile storage media includes dynamic memory, such as main memory in a processing system, and hardware registers in a processing system. In a typical processing system as described above, the storage element is a computer-readable storage medium that is configured with, e.g., encoded with instructions, e.g., logic, e.g., software that when executed by one or more processors, causes carrying out one or more of the method steps described herein. The software may reside in the hard disk, or may also reside, completely or at least partially, within the memory, e.g., RAM and/or within the processor registers during execution thereof by the computer system. Thus, the memory and the processor registers also constitute a non-transitory computer-readable medium on which can be encoded instructions to cause, when executed, carrying out method steps.

While the computer-readable medium is shown in an example embodiment to be a single medium, the term "medium" should be taken to include a single medium or multiple media (e.g., several memories, a centralized or distributed database, and/or associated caches and servers) that store the one or more sets of instructions.

Furthermore, a non-transitory computer-readable medium, e.g., a computer-readable storage medium may form a computer program product, or be included in a computer program product.

In alternative embodiments, the one or more processors operate as a standalone device or may be connected, e.g., networked to other processor(s), in a networked deployment, or the one or more processors may operate in the capacity of a server or a client machine in server-client network environment, or as a peer machine in a peer-to-peer or distributed network environment. The term processing system encompasses all such possibilities, unless explicitly excluded herein. The one or more processors may form a personal computer (PC), a media playback device, a headset device, a hands-free communication device, a tablet PC, a set-top box (STB), a personal digital assistant (PDA), a game machine, a cellular telephone, a Web appliance, a network router, switch or bridge, or any machine capable of executing a set of instructions (sequential or otherwise) that specify actions to be taken by that machine.

Note that while some diagram(s) only show(s) a single processor and a single storage element, e.g., a single memory that stores the logic including instructions, those skilled in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, as will be appreciated by those skilled in the art, embodiments of the present invention may be embodied as a method, an apparatus such as a special purpose apparatus, an apparatus such as a data processing system, logic, e.g., embodied in a non-transitory computer-readable medium, or a computer-readable medium that is encoded with instructions, e.g., a computer-readable storage medium configured as a computer program product. The computer-readable medium is configured with a set of instructions that when executed by one or more processors cause carrying out method steps. Accordingly, aspects of the present invention may take the form of a method, an entirely hardware embodiment, an entirely software embodiment or an embodiment combining software and hardware aspects. Furthermore, the present invention may take the form of program logic, e.g., a computer program on a computer-readable storage medium, or the computer-readable storage medium configured with computer-readable program code, e.g., a computer program product.

It will also be understood that embodiments of the present invention are not limited to any particular implementation or programming technique and that the invention may be implemented using any appropriate techniques for implementing the functionality described herein. Furthermore, embodiments are not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the DESCRIPTION OF EXAMPLE EMBODIMENTS are hereby expressly incorporated into this DESCRIPTION OF EXAMPLE EMBODIMENTS, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All U.S. patents, U.S. patent applications, and International (PCT) patent applications designating the United States cited herein are hereby incorporated by reference, except in those jurisdictions that do not permit incorporation by reference, in which case the Applicant reserves the right to insert any portion of or all such material into the specification by amendment without such insertion considered new matter. In the case the patent rules or statutes do not permit incorporation by reference of material that itself incorporates information by reference, the incorporation by reference of the material herein excludes any information incorporated by reference in such incorporated by reference material, unless such information is explicitly incorporated herein by reference.

Any discussion of other art in this specification should in no way be considered an admission that such art is widely known, is publicly known, or forms part of the general knowledge in the field at the time of invention.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting of only elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other, but may be. Thus, the scope of the expression "a device A coupled to a device B" should not be limited to devices or systems wherein an input or output of device A is directly connected to an output or input of device B. It means that there exists a path between device A and device B which may be a path including other devices or means in between. Furthermore, "coupled to" does not imply direction. Hence, the expression "a device A is coupled to a device B" may be synonymous with the expression "a device B is coupled to a device A." "Coupled" may mean that two or more elements are either in direct physical or electrical contact, or that two or more elements are not in direct contact with each other but yet still co-operate or interact with each other.

In addition, use of the "a" or "an" are used to describe elements and components of the embodiments herein. This is done merely for convenience and to give a general sense of the invention. This description should be read to include one or at least one and the singular also includes the plural unless it is obvious that it is meant otherwise.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added to or deleted from methods described within the scope of the present invention.

What is claimed:

1. A method of sending a stream of packets containing media data via a packet network included in a communication link that has a transmit side and a receive side, the method operative at the transmit side, the method comprising:

forming a particular packet of the stream, including incorporating in the particular packet a classification of a previous packet that is a time period of between 1 s and 5 s earlier in the stream, the classification being indicative of an impact that loss of the previous packet has on a measure of perceptual quality, said measure being dependent on statistics of lost packets and on the respective classifications of the lost packets; and sending the particular packet to a receiver via the packet network, the receiver included in the receive side of the communication link, wherein the receiver receives the particular packet, extracts the incorporated classification information of said previous packet, and buffers the extracted classification information for later use for perceptual quality calculation in the case said previous packet is lost, wherein the receiver accumulates packet loss statistics and for lost packets, determines which respective later packets incorporate the extracted classification for the lost packets, and obtains the buffered classification information on the lost packets, wherein the receiver uses statistics and the obtained respective extracted classifications of the lost packets to calculate the measure of perceptual quality, wherein the transmit side includes an audio processing system, the media data comprises voice data, and the sending is for real-time communication of the stream, including real-time voice communication between the transmit side of the communication link and the receiver.

2. The method of claim 1, further comprising;
forming the particular packet, including:
accepting an amount of digitized media data;
determining a classification of a set of classifications for the amount of digitized media data, different classifications being indicative of different impacts that loss of the amount of digitized media data or of neighboring digitized media data would have on the perceptual media quality of the stream of media data;
storing the determined classification in a buffer such that said stored determined classification can be retrieved for incorporation in one or more later packets;
retrieving the classification of the previous packet from the buffer; and packetizing the amount of digitized media data with the retrieved classification of the previous packet into at least the particular packet.

3. The method of claim 2, wherein the amount of digitized media data is packetized into a plurality of packets of the stream including the particular packet.

4. The method claim 1, wherein the particular packet includes the classification of more than one previous packet.

5. The method of claim 1, wherein the time period is a pre-defined constant that is the same for all packets that incorporate a classification of a previous packet that is the time period earlier in the stream.

6. The method claim 1, wherein the time period varies for different packets in the stream that incorporate a classification of a previous packet that is the time period earlier in the stream.

7. The method of claim 6, wherein packets in the stream have a packet sequence number and wherein the time period is a function of the packet sequence number.

8. The method of claim 7, wherein the time period corresponds to a first number of packets back when the particular packet has a sequence number that is odd and corresponds to a second number of packets back when the particular packet has a sequence number that is even, wherein the first and second numbers have the same parity.

9. The method of claim 6, wherein the time period is varied from packet to packet in a manner that appears random.

10. The method claim 1, wherein the classification of a packet incorporated into another packet depends on at least one of: signal energy of the media data in the packet, recent voice activity in the stream, nuisance of the media data of the packet, and context of the packet.

11. The method claim 1, wherein the audio processing system is in a wireless headset, a cellular telephone, or in a teleconference system.

12. A method, operative at a receive side of a communication link comprising a packet network, of determining a measure of perceptual media quality for communicating an ordered stream of packets of media data over the communication link, the ordered stream sent from a transmit side of the communication link to the receive side of the communication link, the method comprising:
receiving at the receive side of the communication link packets of media data from the ordered stream of media data, a received packet comprising media data and classification information about the media data in a previous packet from the ordered stream that was sent from the transmit side a time period in the range of 1 s to 5 s earlier than the received packet, the classification information comprising one of a set of classifications of digital audio data in a packet, different classifications of the set being indicative of different impacts that loss of the packet containing the digital audio data or loss of one or more neighboring packets, would have on a measure of the perceptual media quality, said measure being dependent on statistics of lost packets and on the respective classifications of the lost packets;
buffering the received packets, so that out-of-order packets can be re-ordered and so that packet loss can be detected;
detecting that a packet is lost, and for each lost packet,
determining which later packet or packets include classification information on the lost packet;
waiting until the later packet that includes classification information on the lost packet is received, and extracting the classification information on the lost packet from the received later packet,
accumulating statistics on packet loss and extracted classifications of packets that are lost; and
calculating the measure of perceptual media quality using the accumulated statistics on packet loss and the extracted classifications of packets that are lost,
wherein the receive side includes an audio processing system, the media data comprises voice data, and the sending of the stream is for real-time communication of the stream, including real-time voice communication between the transmit side of the communication link and the receive side.

13. The method of claim 12, wherein the time period is a pre-defined constant that is the same for all received packets that include classification information of a previous packet that is the time period earlier in the stream.

14. The method of claim 12, wherein the time period varies for different packets in the stream that incorporates classification information of a previous packet that is the time period earlier in the stream.

15. The method of claim 14, wherein packets in the stream have a packet sequence number and wherein the time period is a function of the packet sequence number.

16. The method of claim 15, wherein the time period corresponds to a first number of packets back when a received packet has a sequence number that is odd and corresponds to a second number of packets back when the received packet has a sequence number that is even, wherein the first and second numbers have the same parity.

17. The method of claim 14, wherein the time period is varied from packet to packet in the ordered stream in a manner that appears random.

18. The method of claim 12, wherein each received packet of the stream that includes classification information includes the classification information of more than one previous packet.

19. The method of claim 12, wherein the classification information of a packet incorporated into another packet depends on at least one of: signal energy of the media data in the packet, recent voice activity in the stream, nuisance of the media data of the packet, and context of the packet.

20. The method of claim 12, wherein the classifier, buffer, and packetizer are in a wireless headset, in a cellular telephone, or in a teleconference system.

21. An apparatus for sending a stream of packets containing media data at a transmit side of a communication link that has a receive side and that includes a packet network, the apparatus coupled to the packet network and comprising:
  a classifier operative to accept an amount of digitized media data of or for a particular packet and to determine a classification of a set of classifications for the amount of digitized media data, different classifications being indicative of different impacts that loss of the amount of digitized media data or of neighboring digitized media data would have on a measure of perceptual media quality of the stream of media data, said measure being dependent on statistics of lost packets and on the respective classifications of the lost packets;
  a buffer coupled to or in the classifier and operative to store classifications of packets, including the determined classification of the amount of digitized media data for inclusion of the determined classification in one or more future packets;
  a packetizer operative to retrieve from the buffer and incorporate in the particular packet of the stream a classification of a previous packet that is a time period of 1 s to 5 s earlier in the stream, the classification being indicative of an impact that loss of the previous packet has on the measure of perceptual media quality,
such that the particular packet with amount of digitized media data and the incorporated classification of the previous packet can be sent to a receiver at the receive side via the packet network;
wherein the receiver is operative to receive the particular packet, extract the incorporated classification information of said previous packet, and buffer the extracted classification information for later use for perceptual quality calculation in the case said previous packet is lost,
wherein the receiver accumulates packet loss statistics and for lost packets, determines which respective later packets incorporate the extracted classification for the lost packets, and obtains the buffered classification information on the lost packets,
wherein the receiver uses statistics and the obtained respective extracted classifications of the lost packets to calculate the measure of perceptual media quality,
wherein the media data comprises voice data, and the sending is for real-time communication of the stream, including real-time voice communication between the transmit side of the communication link and the receiver.

22. The apparatus of claim 21, further comprising:
  an input processor operative to accept media data and to form the amount of digitized media data; and
  a coder to encode the digitized media data into a coded form for incorporation into the particular packet.

23. The apparatus of claim 22, wherein the amount of digitized media data is packetized into a plurality of packets of the stream including the particular packet.

24. The apparatus of claim 21, wherein the particular packet in the stream includes in coded form the amount of digitized media data prior to the classifying of the amount of digitized media data, the apparatus further comprising:
  an extractor operative to extract and decode the amount of digitized media data from the particular packet such that the classifier can determine the classification of the amount of digitized media data.

25. The apparatus of claim 21, wherein the time period is a pre-defined constant that is the same for all packets that incorporate a classification of a previous packet that is the time period earlier in the stream.

26. The apparatus of claim 21, wherein the time period varies for different packets in the stream that incorporate a classification of a previous packet that is the time period earlier in the stream.

27. The apparatus of claim 26, wherein packets in the stream have a packet sequence number and wherein the time period is a function of the packet sequence number.

28. An apparatus at a receive side of a communication link comprising a packet network, the apparatus for determining a measure of perceptual media quality for communicating an ordered stream of packets of media data over the communication link, the ordered stream sent from a transmit side of the communication link to the receive side of the communication link, the apparatus comprising:
  a receiver coupled to the packet network and operative to receive packets of media data from the ordered stream of media data, a received packet comprising media data and classification information about the media data in a previous packet from the ordered stream that was sent from the transmit side a time period in the range of 1 s to 5 s earlier than the received packet, the classification information comprising one of a set of classifications of digital audio data in a packet, different classifications of the set being indicative of different impacts that loss of the packet containing the digital audio data or loss of one or more neighboring packets, would have on a measure of the perceptual media quality, said measure being dependent on statistics of lost packets and on the respective classifications of the lost packets;
  a buffer operative to store the received packets, so that out-of-order packets can be re-ordered and so that packet loss can be detected;
  a classification extractor coupled to the buffer and operative to determine the classification information for previous packets from the classification information in packets that are received;
  a packet loss detector to detect packet loss, wherein the packet loss detector and classification extractor in combination are operative to determine for each lost packet which later packet or packets include classification information on the lost packet, and to wait until the later packet that includes classification information on the lost packet is received, so that the classification extractor extracts the classification information on the lost packet;
  a packet loss statistics accumulator coupled to the packet loss detector and operative to accumulate statistics on packet loss and extracted classifications of packets that are lost; and
  a calculator of the measure of perceptual media quality that uses the accumulated statistics on packet loss and the extracted classifications of packets that are lost, wherein the media data comprises voice data, and the sending of the stream is for real time communication, including real-time voice communication between the transmit side of the communication link and the receiver.

29. The apparatus of claim 28, wherein the time period is a pre-defined constant that is the same for all received packets that include classification information of a previous packet that is the time period earlier in the stream.

30. The apparatus of claim 28, wherein the time period varies for different packets in the stream that incorporate classification information of a previous packet that is the time period earlier in the stream.

31. The apparatus of claim 30, wherein packets in the stream have a packet sequence number and wherein the time period is a function of the packet sequence number.

32. The apparatus of claim 31, wherein the time period corresponds to a first number of packets back when a received packet has a sequence number that is odd and corresponds to a second number of packets back when the received packet has a sequence number that is even, wherein the first and second numbers have the same parity.

\* \* \* \* \*